(12) United States Patent
Schultz

(10) Patent No.: US 7,631,163 B2
(45) Date of Patent: Dec. 8, 2009

(54) FAST VIRTUAL TO PHYSICAL MEMORY MAPPING

(75) Inventor: Russell Alvin Schultz, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 289 days.

(21) Appl. No.: 11/356,897

(22) Filed: Feb. 17, 2006

(65) Prior Publication Data

US 2007/0198806 A1 Aug. 23, 2007

(51) Int. Cl.
*G06F 12/06* (2006.01)
(52) U.S. Cl. .......................................... 711/206; 711/203
(58) Field of Classification Search ........................ None
See application file for complete search history.

(56) References Cited

U.S. PATENT DOCUMENTS

| | | | | |
|---|---|---|---|---|
| 3,701,972 A | * | 10/1972 | Berkeley et al. | 710/36 |
| 5,299,147 A | * | 3/1994 | Holst | 365/49.17 |
| 5,479,630 A | * | 12/1995 | Killian | 711/3 |
| 5,765,209 A | * | 6/1998 | Yetter | 711/207 |
| 5,835,962 A | * | 11/1998 | Chang et al. | 711/206 |
| 6,538,650 B1 | * | 3/2003 | Prasoonkumar et al. | 345/419 |
| 2004/0162961 A1 | * | 8/2004 | Lyon | 711/207 |

* cited by examiner

*Primary Examiner*—Than Nguyen
(74) *Attorney, Agent, or Firm*—Toler Law Group

(57) ABSTRACT

A system and method for managing memory is disclosed. The system includes a computer memory array and a memory management unit accessible to the memory array. The memory management unit includes a plurality of parallel comparators. The comparators receive a virtual memory address and perform a comparison of the virtual memory address to a plurality of predetermined addresses. The memory management unit also includes logic responsive to outputs of each of the comparators to determine a physical memory address of an element within the memory array.

23 Claims, 4 Drawing Sheets

FAST VIRTUAL TO PHYSICAL MEMORY MAPPING

FIELD OF THE DISCLOSURE

The present disclosure is related to management of memory devices.

BACKGROUND

Many computer memory systems employ virtual addresses. Generally, virtual addresses are addresses of virtual memory locations. These virtual addresses may not be referenced by actual hardware, but can be used by computer programs. A virtual address may be different than the physical address that is indicative of a physical memory location in a computer memory. For example, a computer program or operating system may use virtual addressing to implement a particular memory organization scheme. The use of virtual addresses may allow the memory scheme to be implemented more efficiently. In addition, the use of virtual addressing allows a computer program or operating system to be used with different types and brands of physical memory, because the program or operating system is not tailored to the particular physical addresses associated with any particular memory type or brand.

However, in order for the program or operating system to interact with the physical memory, each virtual address may be translated to a physical memory address. This can be done with a memory management unit (MMU). An MMU performs a translation function to translate a virtual address into a physical address. To perform the address translation function, the memory management unit may use a table showing the relation between the virtual and physical addresses. Such a table can be stored in the computer memory. In other systems, the address translation function may be performed using one or more arithmetic operations. However, each of these translation approaches may require be undesirably complex, and may consume excess time or power. Accordingly, there is a need for an improved memory management system and method.

DESCRIPTION OF THE DRAWINGS

A system and method for managing memory is disclosed. The system includes a computer memory array and a memory management unit accessible to the computer memory array. The memory management unit includes a plurality of parallel comparators. The comparators receive a virtual memory address and perform a comparison of the virtual memory address to a plurality of predetermined addresses. The memory management unit also includes logic responsive to outputs of each of the comparators to determine a physical memory address of an element within the computer memory array.

The method includes receiving a virtual address from a computer device at a memory management unit coupled to the memory device and concurrently comparing at least a portion of the virtual address to different comparators. Each of the comparators is associated with a physical address of the memory device. The method further includes determining a physical address to access the memory device after performing the concurrent comparison. In addition, at least two of the different comparators are associated with a common physical address.

Figure 1:
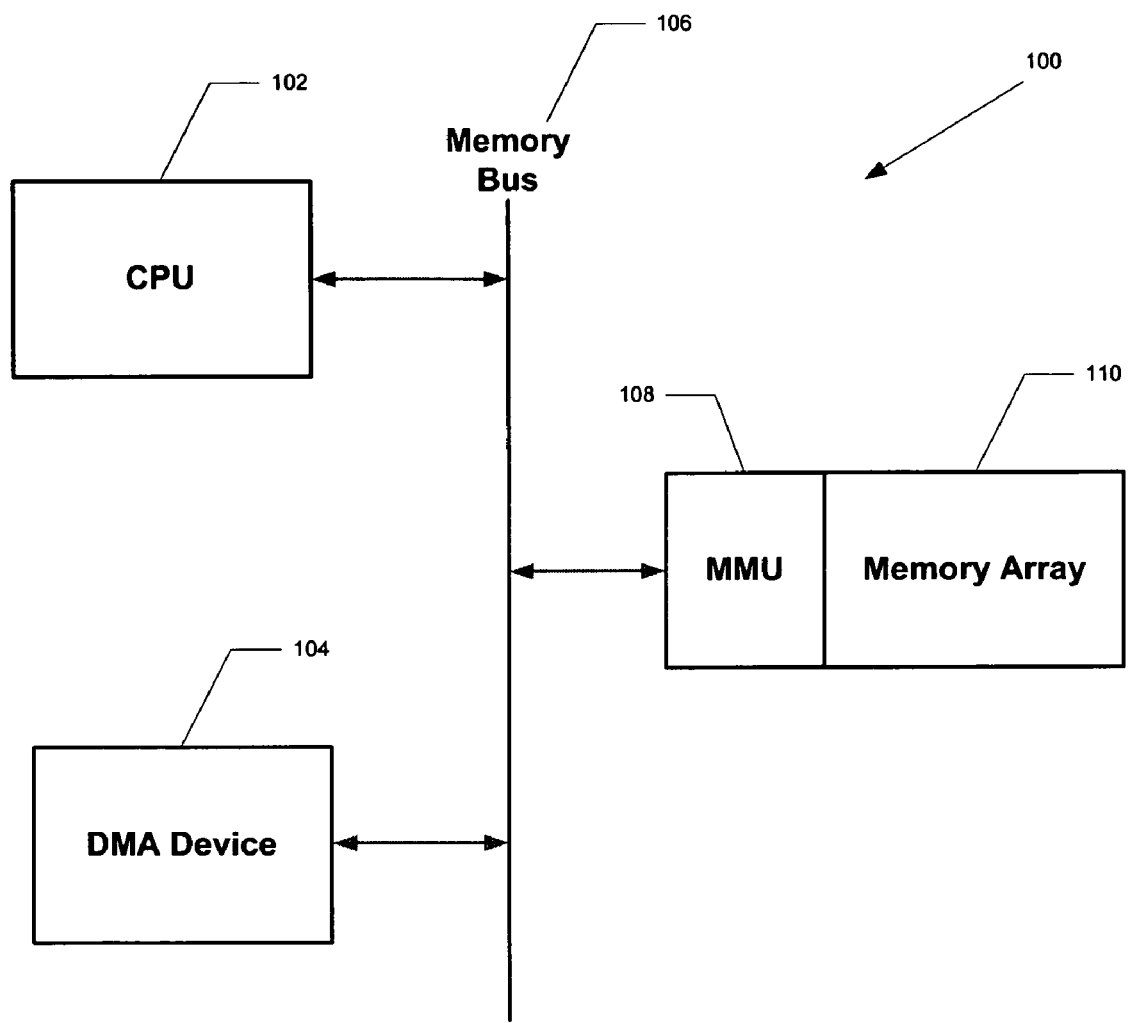
FIG. 1 is a block diagram of a particular illustrative embodiment of a system including a memory management unit.

Referring to FIG. 1, block diagram of a particular embodiment of a system 100 including a memory management unit (MMU) 108 is illustrated. The system 100 includes a central processing unit (CPU) 102 and a direct memory access (DMA) device 104. The system 100 also includes a memory bus 106 and a memory array 110. The MMU 108 is responsive to the CPU 102 and the DMA device 104 via the memory bus 106. The MMU 108 is accessible to the memory array 110.

During operation, the CPU 102 and the DMA device 104 may send memory requests to the memory array 110 via the MMU 108. The CPU 102 may be a microprocessor, microcontroller, or other processor or controller. In addition, the CPU 102 may be incorporated in a computer device, a portable device such as a cell phone or portable music player, a consumer electronic device such as a television, DVD player or radio tuner, or other appropriate device. The CPU 102 may run software programs to implement the desired functions of the system 100. For example, in the case of a portable music player, the CPU 102 may run software programs to store, organize, and play music files. The software programs run by the CPU 102 may also include an operating system or firmware to handle normal system functions, such as organization and maintenance of the memory array 110. The software programs may be stored in the memory array 110 or in another memory device.

In the course of running the software programs, the CPU 102 may access the memory array 110. For example, the CPU 102 may perform a read operation or a write operation on the memory array 110. In the case of a read operation, the CPU 102 may provide a virtual address to the memory management unit 108. The virtual address may be an address provided by a software program running on the CPU 102.

In addition, in some systems it may be desirable for the memory array 110 to be accessible to peripheral modules, such as printers, audio and video hardware, user interfaces, and the like. Access to memory array 110 by the peripheral modules can be managed by the CPU 102, but this may consume undesirable overhead and use of CPU time. Accordingly, the DMA device 104 can manage access to the memory array 110 by the peripheral modules, thereby saving CPU 102 overhead and time. The DMA device 104 may receive memory requests, such as read or write operations from various peripheral modules. The DMA device 104 may organize and prioritize these memory requests by placing the requests in a request queue. The DMA device 104 may send successive requests from the queue to the memory array 110 via the MMU 108. The DMA device 104 may also receive the response to each request from the memory array 110, organize and prioritize the responses in a response queue, and send successive responses from the response queue to the appropriate requesting peripheral module.

In addition, in a particular embodiment, the memory management unit 108 and the memory array 110 may be located on the same integrated circuit as the CPU 102. Alternatively, the CPU 102 may be coupled to additional memory devices external to the integrated circuit. Accordingly, the memory MMU 108 and the memory array 110 may respond more rapidly to memory requests from the CPU 102 relative to the external memory devices. Therefore, the CPU 102 may store information in the memory array 110 associated with low-latency memory requests. For example, the CPU 102 may store information associated with high-speed software programs, or high priority portions of a particular software program. Alternatively, the CPU 102 may store information in the memory array 110 according to a particular memory management scheme. For example, in the case of a portable music player, some system functions, such as a music playback function, may be used more often than others. The more frequently used functions may be stored in the memory array 110, improving the overall system efficiency.

Further, the virtual memory address space, or the range of virtual addresses that are addressable by the CPU 102 or the DMA device 104, may be larger than the range of physical addresses associated with the memory array 110. For example, a software program running on the CPU 102 may employ a virtual addressing scheme that includes a range of possible virtual address that is larger than the number of physical addresses associated with the memory array 110. The software program may do this for a variety of reasons. For example, a large range of virtual addresses may be useful for program flexibility; i.e. by using a large range of virtual addresses the software program may be used in conjunction with a wide variety of physical memory devices, including physical memory devices that are large enough to include a physical address for each virtual address. In contrast, if the range of virtual addresses were smaller than the range of physical addresses for a particular memory device, some of the memory device would be unused, possibly resulting in system inefficiency or wasted memory.

Accordingly, in some applications it may be desirable that the MMU 108 is coupled together with the memory array 110 is able to respond rapidly to memory requests and also process memory requests associated with a virtual address space that may be larger than the physical address space of the memory array 110. In conjunction with a memory request from the CPU 102 or the DMA DEVICE 104, the MMU 108 will typically receive a virtual memory address associated with the request via the memory bus 106. As explained with respect to FIG. 2, the MMU 108 compares the received virtual address to a plurality of predetermined virtual addresses. Each predetermined virtual address is associated with a physical address of the memory array 110. Based on the comparisons the MMU 108 determines a physical address associated with the received virtual address, and provides the physical address to the memory array 110. The memory array 110 responds to the memory request based on the physical address. For example, in the case of a read operation, the memory array 110 may send data stored at the physical address to the CPU 102 or the DMA DEVICE 104.

In a particular embodiment, the virtual address received by the MMU 108 is compared to several predetermined addresses in parallel. This allows the MMU 108 to rapidly process a memory request. In addition, in a particular embodiment, the MMU 108 is implemented using logic hardware, which can increase the speed of the MMU 108 as well as reduce the size and power required by the memory management unit.

In a particular embodiment, the MMU 108 is co-located with the memory array 110. In another particular embodiment, the MMU 108 is embedded in the memory array 110. Co-locating or embedding the MMU 108 with the memory array 110 may provide speed or other performance benefits for the MMU 108.

Figure 2:
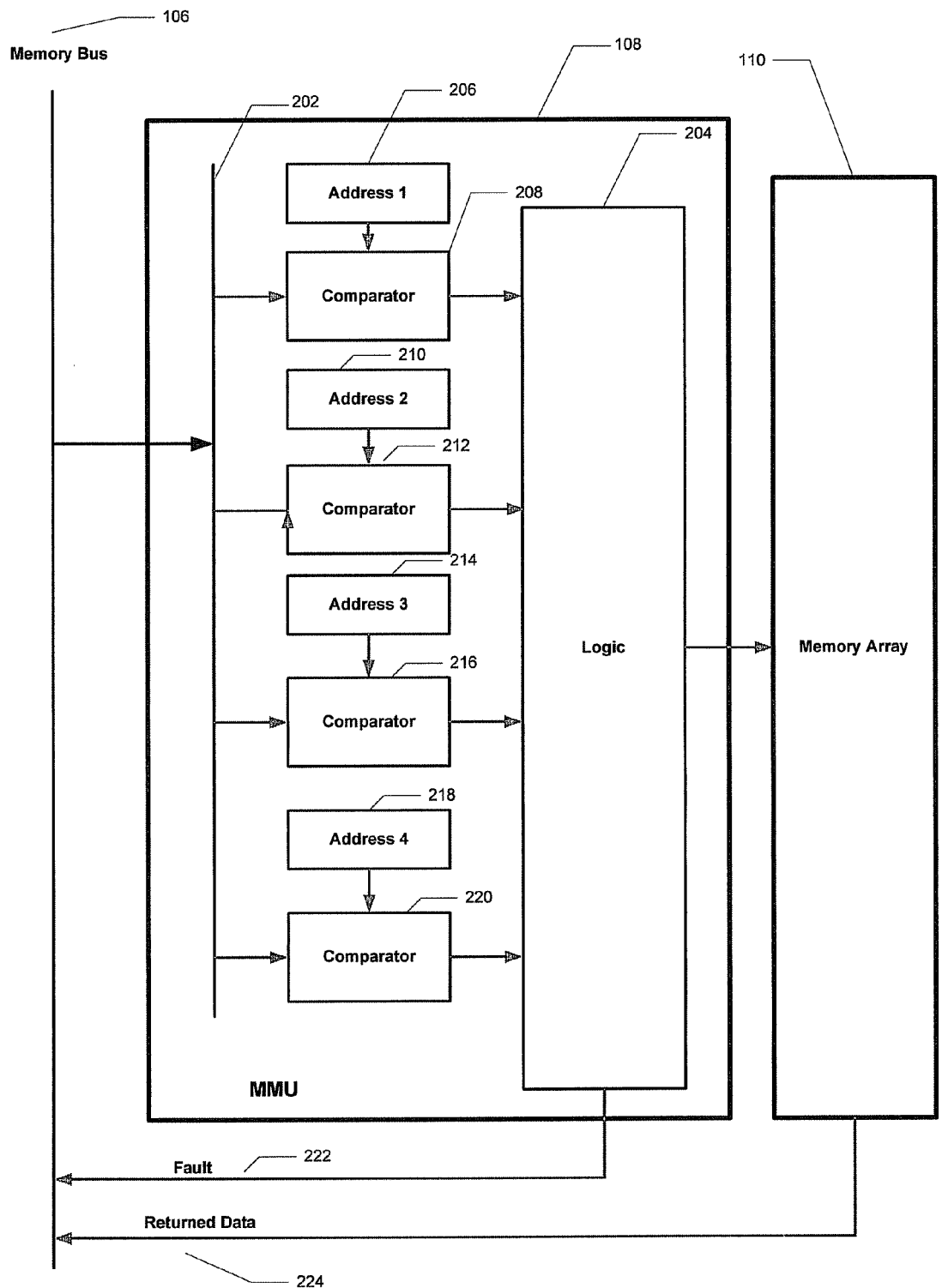
FIG. 2 is a block diagram of a particular illustrative embodiment of the memory management unit illustrated in FIG. 1.

Referring to FIG. 2, a block diagram of a particular embodiment of the memory management unit 108 of FIG. 1 is illustrated. The MMU 108 includes an internal bus 202. The MMU 108 also includes a plurality of comparators, including a first comparator 208, a second comparator 212, a third comparator 216 and a fourth comparator 220. The MMU 108 further includes a plurality of predetermined addresses, including a first predetermined address 206, a second predetermined address 210, a third predetermined address 214, and a fourth predetermined address 218. In addition, the MMU 108 includes logic 204.

As illustrated, the internal bus 202 is responsive to the memory bus 106. In addition, each of the plurality of comparators, such as the first comparator 208 and the second comparator 212, are responsive to the internal bus 202. Further, the logic 204 is responsive to an output of each of the comparators. Moreover, the memory array 110 is coupled to the logic 204 and the logic 204 is coupled to the memory bus 106 via a fault line 222. The memory array 110 is coupled to the memory bus 106 via a returned data bus 224.

During operation, the internal bus 202 may receive a virtual memory address via the memory bus 106. As explained with respect to FIG. 1, the virtual memory address may be provided by the CPU 102, the DMA device 104, or another device. The internal bus 202 may be of a similar size to the memory bus 106. For example, if the memory bus 106 is a 16 bit bus, the internal bus 202 may also be a 16 bit bus. In an alternative illustrative embodiment, the internal bus 202 may be smaller than the memory bus 106, and may be configured to receive only a portion of the virtual memory address. For example, the internal bus 202 may be configured so that it receives only a middle and lower portion of the virtual memory address, and truncates an upper portion of the address. This may be appropriate in certain virtual address schemes. For example, the virtual address scheme for the system 100 may be configured so that the upper portion of the virtual address refers to a particular memory device, memory page, or memory region. If the memory array 110 is comprised of a single memory device, page, or region, then any virtual address associated with the memory array 110 will include the same upper portion. Accordingly, the upper portion of the received virtual memory address may be truncated, and only a middle and lower portion of the virtual memory address may be provided to the internal bus 202.

The internal bus 202 provides the received virtual memory address to each of the plurality of comparators. Each of the plurality of comparators concurrently compares the received virtual address to a predetermined virtual address. For example, the first comparator 208 compares the received virtual address to the first predetermined address 206, while the second comparator 212 compares the received virtual address to the second predetermined address 210.

The predetermined address may be stored in a variety of ways. For example, the predetermined addresses may be stored in a ROM. In another particular embodiment, the predetermined addresses may be stored in a plurality of logic gates with fixed inputs. The outputs of the logic gates provide the predetermined address. The use of logic gates may provide for faster operation of the MMU 108.

The logic 204 is responsive to the outputs of the plurality of the comparators. Accordingly, based on the comparisons made by the comparators to the received virtual address, the logic 204 can select a physical address associated with the received virtual address and provide the selected physical address to the memory array 110. For example, if the output of the first comparator 208 indicates that the received virtual address matches the first predetermined address 206, the logic 204 may select a physical address associated with the first predetermined address 206.

In a particular embodiment, a physical address of the memory array 110 may be associated with more than one virtual address. For example, two different software programs running on the CPU 102 may implement different virtual addressing schemes, wherein a particular physical address of the memory array 110 is associated with a different virtual address in each scheme.

In addition, in a particular embodiment, the address space of the virtual memory addresses comparable by the MMU 108 is greater than the physical address space of the memory array 110. For example, the address space of the virtual memory addresses comparable by the MMU 108 may be more than 10 times greater than the physical address space of the memory array 110. Because the comparisons of the received virtual address are taking place in parallel, a large virtual address space may be mapped to a relatively small physical address space quickly.

In the event that a match between the received virtual address and one of the predetermined addresses is found, the logic 204 provides a physical address associated with the received virtual address to the memory array 110. In response, the memory array 110 can perform the appropriate operation at the physical address. For example, in the case of a read operation, the memory array 110 can provide the data stored at the physical address to the memory bus 106 via the returned data bus 224. In the case of a write operation, the memory array 110 can store data at the physical address, and provide an acknowledgement that the data was written via the returned data bus 224.

In contrast, if a match between the received virtual address and one of the predetermined addresses is not found, the logic 204 may assert a fault indication via the fault line 222. This fault indication may be communicated to the CPU 102 or the DMA device 104 via the memory bus 106. In response to the fault indication, the CPU 102 or the DMA device 104 may take a variety of actions. For example, the CPU 102 may provide an error indication to the software program making the memory request associated with the fault. Similarly, the DMA device 104 can provide an error indication to the peripheral device making the memory request. Alternatively, the CPU 102 or the DMA device 104 may alter the virtual memory address associated with the memory request in response to the fault indication.

Figure 3:
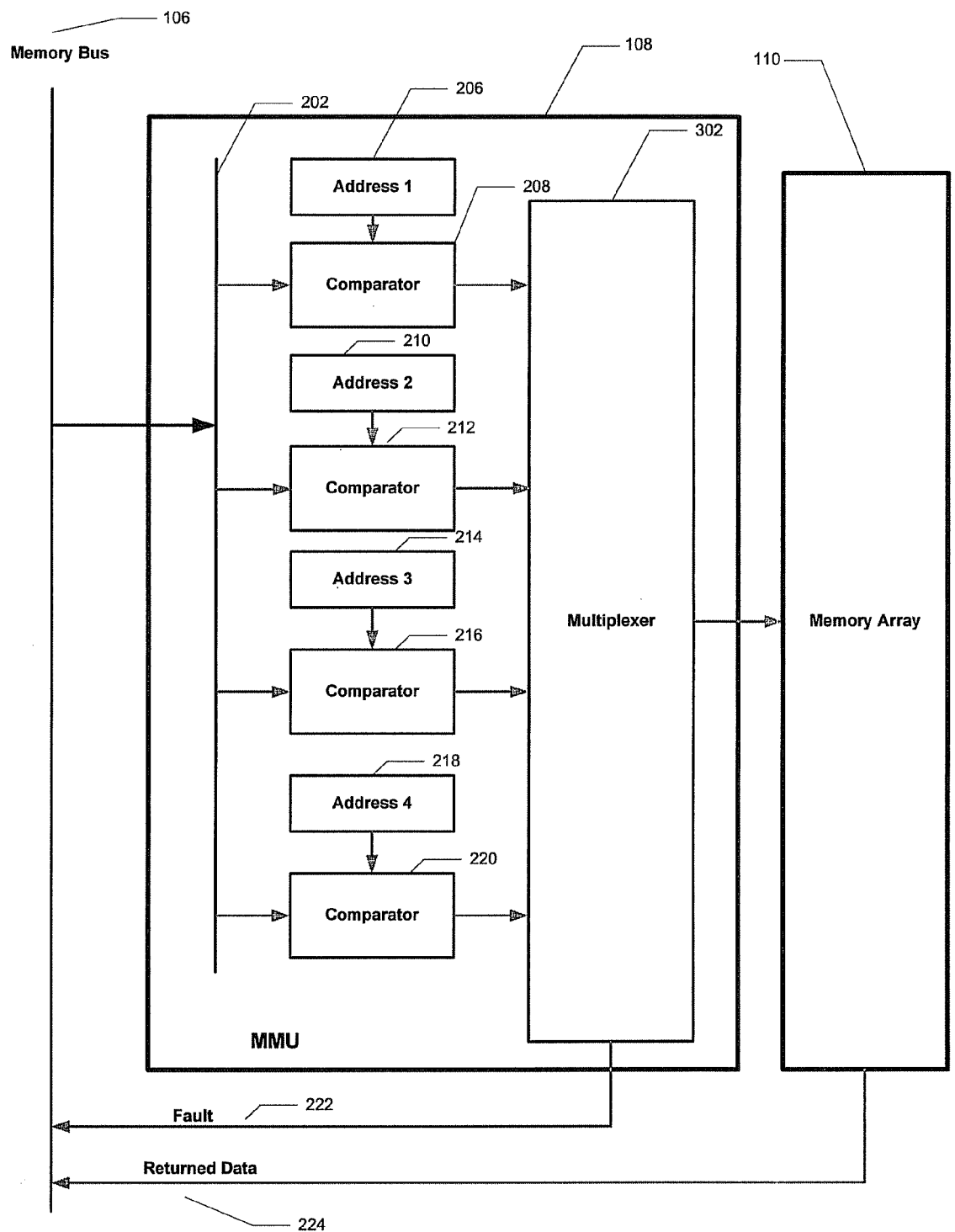
FIG. 3 is a block diagram of another particular embodiment of the memory management unit illustrated in FIG. 1.

Referring to FIG. 3, another particular illustrative embodiment of the memory management unit (MMU) 108 of FIG. 1 is illustrated. The MMU 108 of FIG. 3 is similar to the MMU illustrated in FIG. 2, but the logic 204 has been replaced by a multiplexer 302. During operation, the multiplexer 302 is responsive to the outputs of the plurality of comparators, and provides a physical address to the memory array 110 based on the comparator outputs.

The configuration of the comparators 208 through 220 and the multiplexer 302 can result in decreased access times associated with the memory array 108. For example, because the comparators are configured in a parallel arrangement, the proper address may be found more quickly than in other arrangements.

Figure 4:
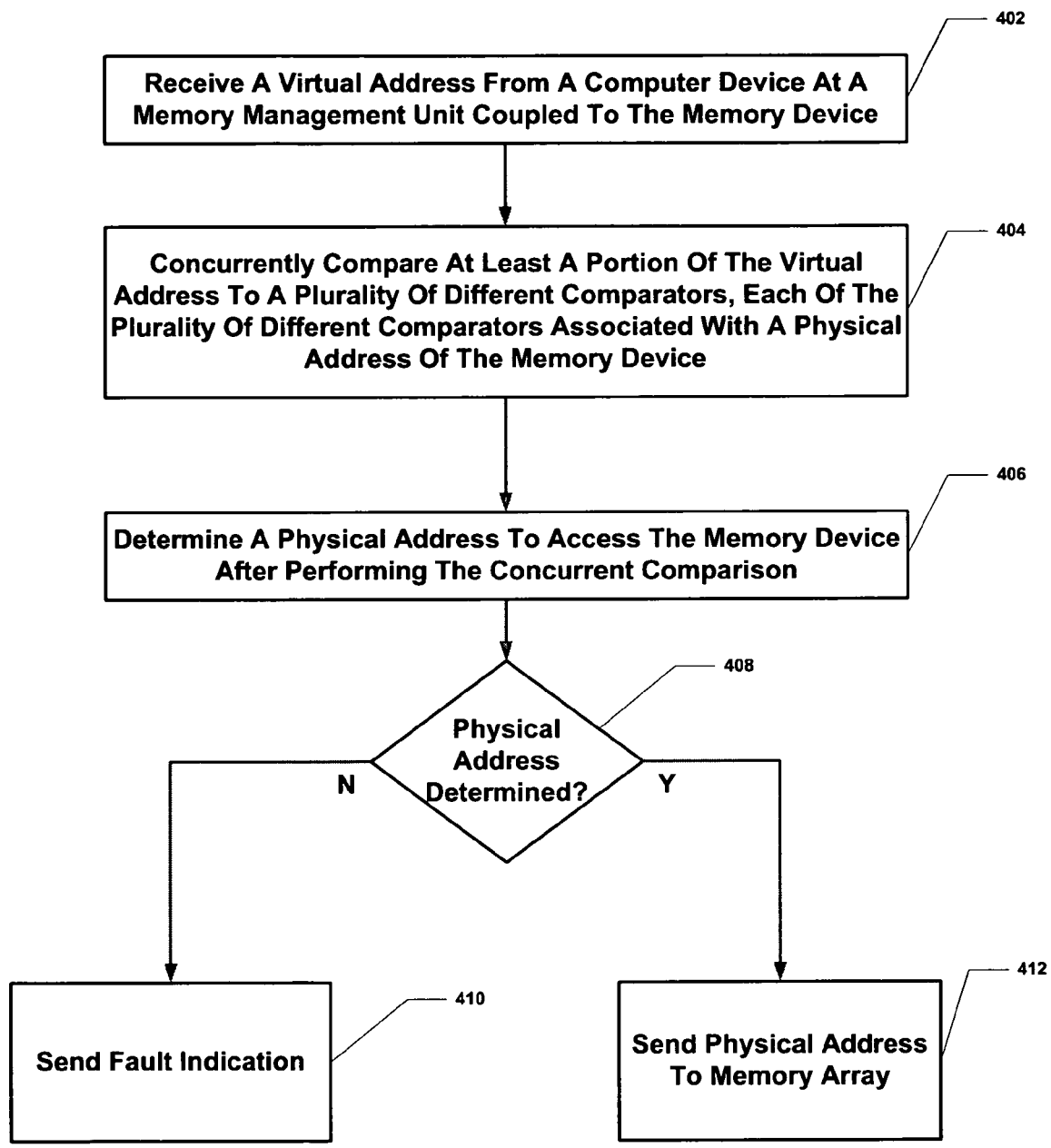
FIG. 4 is a flow diagram of a method of translating a virtual address to a physical address.

Referring to FIG. 4, a particular illustrative embodiment of a method of translating a virtual address to a physical address is illustrated. This method may be implemented by the MMU 108 illustrated in FIGS. 1, 2, and 3. At block 402, a virtual address is received from a computer device at a memory management unit coupled to the memory device. As explained with respect to FIG. 1, the virtual address may be received from a CPU, a DMA device, or another device. The virtual address may be received in conjunction with a memory request, such as a read request or a write request.

Moving to block 404, at least a portion of the virtual address is concurrently compared to a plurality of different comparators, such as the comparators described with respect to FIG. 2. Each of the plurality of different comparators is associated with a physical address of the memory device.

In a particular embodiment, the entire virtual address is compared to each of the plurality of comparators. As explained with respect to FIG. 1, in another embodiment it may be more efficient for the comparators to compare only a portion of the virtual address. Accordingly, in another particular embodiment, a middle portion of the virtual address is compared to each of the plurality of comparators. This may improve the speed of the address translation process.

Proceeding to block 406, a physical address is determined to access the memory device after performing the concurrent comparison operations. The physical address may be determined based on the output of the comparators, as explained with respect to FIG. 2. In addition, the physical address may be determined by logic, by a multiplexer, by a processor, or other appropriate device.

Moving to decision block 408, it is determined whether a physical address associated with the received virtual address has been found. If a physical address is not found, the method proceeds to block 410 and a fault indication is sent. The fault indication may be sent to the device that sent the virtual address, such as the CPU or DMA device. In addition, the fault signal may be recorded for later analysis or diagnostic treatment.

If a physical address associated with the received virtual address is found at block 408, the method moves to block 412 and the physical address is sent to a memory array. The memory array may act on the memory request based on the physical address. For example the memory array may return data located at the physical address to the requesting device, such as the CPU or DMA device.

In addition, in some virtual memory schemes, a lower portion of a virtual address is identical to a lower portion of an associated physical address. Such schemes may be useful to reduce the complexity of the address translation process. In such schemes, the lower portion of the virtual memory address may be provided to the memory array, and only a middle or upper portion of the virtual address is translated.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory device comprising:
a memory array; and
a memory management unit accessible to the memory array, the memory management unit including:
a plurality of parallel comparators to receive a portion of a virtual memory address, each comparator to perform a comparison of the portion of the virtual memory address to a portion of a predetermined address of a plurality of predetermined addresses, wherein the predetermined address for each comparator is stored in hardware in a plurality of logic gates with fixed inputs; and logic responsive to outputs of each of the plurality of parallel comparators to determine a physical memory address of the memory array associated with the virtual memory address;

wherein the portion of the virtual memory address includes a middle portion and an upper portion, wherein a bus truncates the upper portion of the virtual address and each of the plurality of parallel comparators receive the middle portion and the truncated upper portion of the virtual address.

2. The memory device of claim 1, wherein the responsive logic includes a multiplexer, and wherein at least two of the plurality of parallel comparators receive a common physical predetermined address.

3. The memory device of claim 1, wherein an address space of virtual memory addresses comparable by the plurality of comparators is greater than a physical address space of the memory array.

4. The memory device of claim 3, wherein the address space of the virtual memory addresses comparable by the plurality of comparators is more than ten times greater than the physical address space of the memory array.

5. The memory device of claim 1, wherein the responsive logic sends a fault indication when the portion of the virtual memory address does not correspond to any one of the plurality of predetermined addresses.

6. The method of claim 1, wherein the predetermined address is a physical address.

7. The method of claim 1, wherein the memory array stores a frequently-used function of a software program.

8. The method claim 7, wherein the frequently-used function is a music playback function.

9. A memory management unit, comprising:
a plurality of parallel comparators to receive a portion of a virtual memory address, each comparator to perform a comparison of the portion of the virtual memory address to a portion of a predetermined physical address of a plurality of predetermined physical addresses of a memory, wherein the predetermined physical address for each comparator is stored in a plurality of logic gates with fixed inputs; and logic responsive to outputs of each of the plurality of parallel comparators to determine a physical memory address associated with the virtual memory address;

wherein the portion of the virtual memory address includes a middle portion and an upper portion, wherein a bus truncates the upper portion of the virtual memory address and each of the plurality of parallel comparators receive the middle portion and the truncated upper portion of the virtual address.

10. The memory management unit of claim 9, further comprising:
a fault output responsive to the responsive logic, wherein the responsive logic asserts a signal at the fault output when the portion of the virtual memory address does not correspond to any of the predetermined physical addresses.

11. The memory management unit of claim 9, wherein the portion of the virtual memory address is received from a direct memory access (DMA) device.

12. The memory management unit of claim 9, wherein the memory management unit and a memory array are located together on an integrated circuit.

13. The memory management unit of claim 9, wherein the logic includes a multiplexer.

14. The memory management unit of claim 9, wherein the portion of the virtual memory address is received from a central processing unit (CPU).

15. A memory, comprising:
a plurality of addressable memory locations, wherein each memory location corresponds to a physical address;
an input to receive a physical address request corresponding to one of a physical address of one of the plurality of addressable memory locations; and
an output to provide data to a memory bus;
wherein the physical address request is received from a memory management unit that includes:
a bus configured to receive a portion of a virtual memory address;
a plurality of parallel comparators to receive the portion of the virtual memory address, each comparator to concurrently perform a comparison of the portion of the virtual memory address to a predetermined physical address associated with the comparator; and
logic responsive to outputs of each of the plurality of parallel comparators to determine a physical memory address of an element within a memory array; and
wherein the portion of the virtual memory address includes a middle portion and an upper portion, and wherein the bus is configured to receive the middle portion and to truncate the upper portion of the virtual address.

16. The method of claim 15, wherein a lower portion of the virtual memory address is identical to a lower portion of an associated physical address.

17. The method of claim 16, further comprising: providing the lower portion of the virtual memory address to the computer memory array.

18. A method of managing a memory device, the method comprising:
receiving a virtual address from a computer device at a memory management unit coupled to the memory device;
concurrently comparing a portion of the virtual address using a plurality of different comparators, each of the plurality of different comparators associated with a physical address of the memory device, wherein the virtual address includes a middle portion and an upper portion, and wherein the upper portion of the virtual memory address is truncated by a bus at the memory management unit;
determining a physical address to access the memory device after performing the concurrent comparison; and
wherein at least two of the different comparators are associated with a common physical address.

19. The method of claim 18, wherein the memory management unit is coupled to the memory device.

20. The method of claim 19, wherein the memory management unit is embedded within the memory device.

21. The method of claim 18, wherein concurrently comparing at least a portion of the virtual address includes comparing a the middle portion of the virtual address.

22. The method of claim 18, wherein the computer device is a direct memory access (DMA) device.

23. The method of claim 18, wherein a lower portion of the virtual memory address is identical to a lower portion of a predetermined physical address associated with the virtual memory address.

* * * * *